United States Patent [19]

Castle

[11] Patent Number: 5,737,754
[45] Date of Patent: Apr. 7, 1998

[54] CACHE MEMORY WHICH SELECTS ONE OF SEVERAL BLOCKS TO UPDATE BY DIGITALLY COMBINING CONTROL BITS IN ALL THE BLOCKS

[75] Inventor: David Edgar Castle, Poway, Calif.

[73] Assignee: Unisys Corporation, Blue Bell, Pa.

[21] Appl. No.: 619,050

[22] Filed: Mar. 20, 1996

[51] Int. Cl.[6] .................................................. G06F 12/12
[52] U.S. Cl. .................................... 711/136; 711/160
[58] Field of Search .............................. 395/463, 471, 395/472, 460, 486, 487

[56] References Cited

U.S. PATENT DOCUMENTS

| | | | |
|---|---|---|---|
| 5,313,605 | 5/1994 | Huck et al. | 395/403 |
| 5,325,504 | 6/1994 | Tipley et al. | 395/455 |
| 5,353,425 | 10/1994 | Malamy et al. | 395/471 |

Primary Examiner—Eddie P. Chan
Assistant Examiner—Kevin L. Ellis
Attorney, Agent, or Firm—Charles J. Fassbender; Mark T. Starr; Steven R. Petersen

[57] ABSTRACT

A cache memory includes: a plurality of tag memory blocks, each of which stores multiple compare addresses; a first bus which sends a low order address to all of the tag memory blocks; a respective output from each tag memory block on which a compare address is read in response to the low order address; a second bus which carries a high order address; and, a comparator circuit which generates a miss signal when the compare address on the output from every tag memory block miscompares with the high order address. Each tag memory block further stores respective control bits with each compare address; and each tag memory block responds to the low order address by reading the compare address and the respective control bits, in parallel, on its respective output. A digital logic circuit is coupled to the outputs from all of the tag memory blocks; and this digital logic circuit selects one of the tag memory blocks to write, when the miss signal occurs, by digitally combining the control bits that are read by the low order address from all of the tag memory blocks.

15 Claims, 7 Drawing Sheets

CACHE MEMORY WHICH SELECTS ONE OF SEVERAL BLOCKS TO UPDATE BY DIGITALLY COMBINING CONTROL BITS IN ALL THE BLOCKS

BACKGROUND OF THE INVENTION

This invention relates to the structure and operation of cache memories; and more particularly, it relates to control circuits that are incorporated into the cache memory for selecting a particular tag memory block and corresponding data memory block to update when a cache miss occurs.

In the prior art, many cache memories have been described which are intercoupled between a main memory and a digital computer. From a speed point of view, the cache memory always is faster than the main memory. But, the cache memory always has substantially less storage capacity than the main memory; and thus, the cache memory attempts to store just those data words from the main memory which the digital computer is most likely to need for its operations. By storing the right data words in the cache, the digital computer's overall performance is increased. For example, if the cache memory operates twice as fast as the main memory and if 90% of the data words which the digital computer needs are in the cache memory, then the cache memory increases the overall performance of the digital computer 200×90% or 180%.

However, in order for the cache memory to operate properly, it must somehow be able to determine whether each particular data word which the digital computer requests is, or is not, stored within the cache memory. To make this determination, the cache memory typically includes several data memory blocks and corresponding tag memory blocks. Data words are stored in the data memory blocks, and compare addresses for the data words are stored in the tag memory blocks.

When a data word is requested by the digital computer, the computer supplies an address which is partitioned within the cache memory into a low order address and high order address. That low order address is used by the cache memory to read respective data words from the data memory blocks in parallel, and to simultaneously read compare addresses from the corresponding tag memory blocks. All of the compare addresses which are read from the tag memory blocks are then compared with the high order address from the digital computer. If the high order address matches the compare address which is read from the i-th tag memory block, then the data word which is read from the i-th data memory block is sent to the computer.

If however, the high order address from the digital computer miscompares with the compare addresses from all of the tag memory blocks, then a cache "miss" occurs; and the data word which the digital computer requested must be obtained from the main memory. In response to the cache miss, the data word which is read from the main memory is also written into one of the data memory blocks; and simultaneously, the high order address from the digital computer is written as a new compare address into the corresponding tag memory block. This write operation is called a cache "update".

To perform the cache update operation, a particular one of the data memory blocks and corresponding tag memory blocks needs to be selected for the write. In the prior art, this selection was made by providing a separate block of control memory which was addressed by the low order address from the digital computer. Within the control memory block, a respective set of control bits was stored at each storage location which was addressed by the low order address; and those control bits identified the data memory block and corresponding tag memory block which were to be written. This write occurred, in the selected tag memory block and data memory block, at the storage location which was being addressed by the low order address from the digital computer.

For example, suppose that a cache miss occurred while the high order address from the digital computer equaled $(1234)_{16}$, the low order address from the digital computer equaled $(5678)_{16}$, and the control bits at that low order address in the control memory block equaled $(10)_2$. In that case, the second tag memory block would be updated at location $(5678)_{16}$ with the compare address $(1234)_{16}$, the second data block would be updated at location $(5678)_{16}$ with a data word from the main memory; and, the control bits at location $(5678)_{16}$ in the control memory block would be updated with new control bits. These new control bits would identify the tag memory block and corresponding data memory block that should be updated the next time that a cache miss occurs while the low order address equals $(5678)_{16}$.

However, one problem with the above-described prior art cache is that the control memory block can waste alot of memory. This waste will occur when the control memory block is made of standard integrated circuit memory chips which now have multiple bits per word. Originally, the standard memory chips contained only a single bit per word. But throughout the last decade, the storage capacity of standard memory chips has steadily grown; and today, the standard memory chips hold 8 or 9 or 16 or 18 bits per word. Two examples of these chips are the MCM6265C chip from Motorola which is 8K words by 9 bits per word, and the MCM62996 from Motorola which is 16K words by 16 bits per word.

In the control memory block, only a few control bits per word are needed. For example, a cache memory which has a total of four tag memory blocks and four corresponding data memory blocks uses a control memory with only two control bits per word. Consequently, if such a control memory block is made of standard memory chips which have 8 bits per word, then 75% of the control memory block is wasted.

Accordingly, a primary object of the invention is to provide a novel architecture for a cache memory in which the above waste is eliminated.

BRIEF SUMMARY OF THE INVENTION

Within the disclosed cache memory, the following conventional components still exist: a plurality of tag memory blocks, each of which stores multiple compare addresses; a first bus which sends a low order address to all of the tag memory blocks; a respective output from each tag memory block on which a compare address is read in response to the low order address; a second bus which carries a high order address; and, a comparator circuit which generates a miss signal when the compare address on the output from every tag memory block miscompares with said high order address. But, in accordance with the present invention, each tag memory block also stores respective control bits with each compare address; and, each tag memory block responds to the low order address by reading a compare address and the respective control bits on its respective output. Further, in accordance with the present invention, a digital logic circuit is coupled to each output from all of the tag memory blocks, and this digital logic circuit selects one of the tag memory blocks to write when the miss signal occurs by digitally combining the control bits that are read from all of the tag memory blocks.

In one particular embodiment, the digital logic circuit selects a tag memory block to write by exclusive-oring together the control bits that are read from all of the tag memory blocks and adding a constant to the result. New control bits for the selected tag memory block are then generated via the digital logic circuit by exclusive-oring the above result with the control bits that are read from all of the tag memory blocks except the selected block. With this particular embodiment, each tag memory block is implemented with a standard memory chip which holds 18 bits per word; the compare address in each stored word occupies 16 bits; and this leaves 3 bits per word for use as the control bits. Thus, the cache memory can have up to 8 tag memory blocks and 8 corresponding data memory blocks; and the separate control memory is completely eliminated.

DETAILED DESCRIPTION

Figure 1:
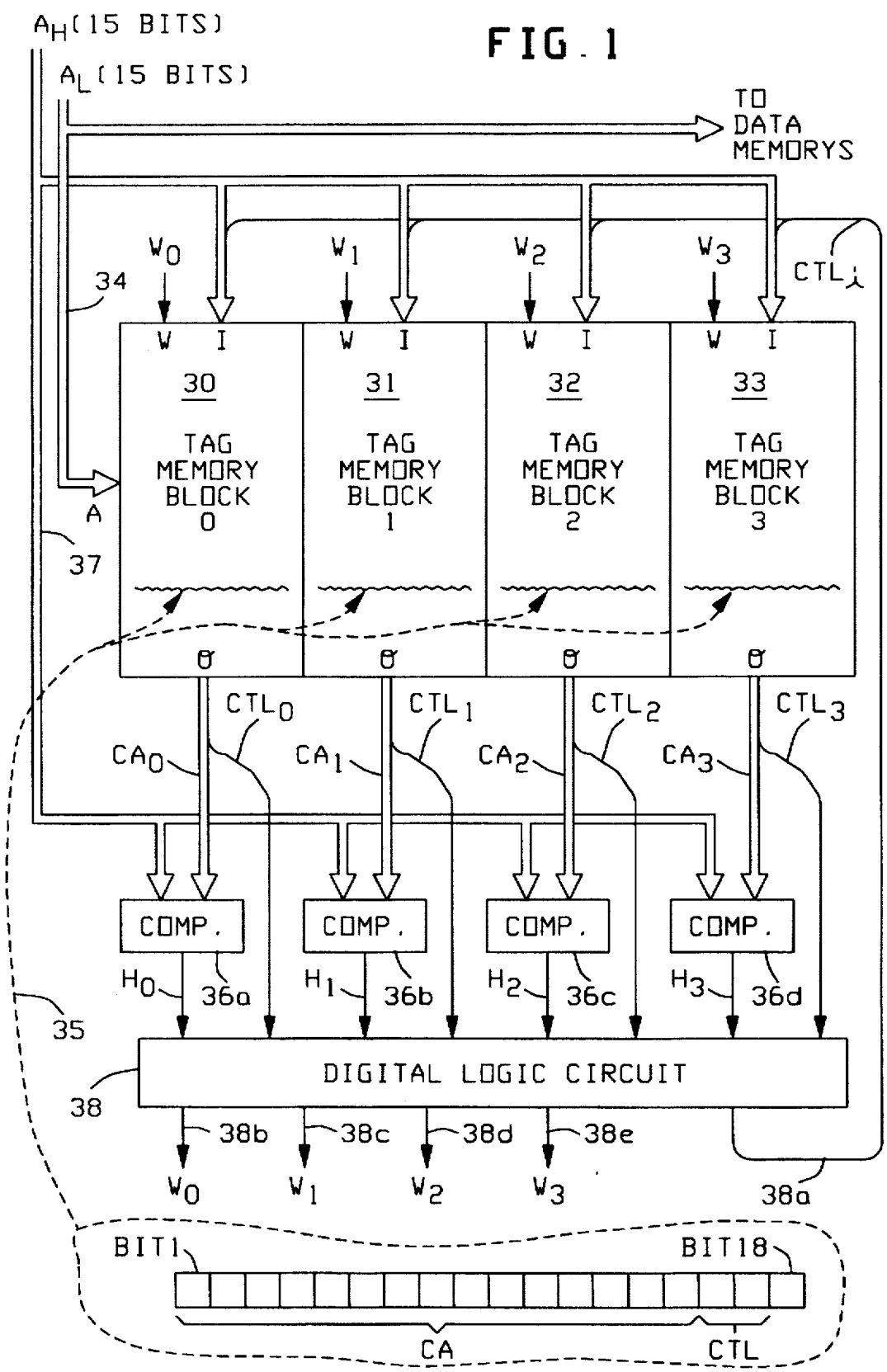
FIG. 1 shows a block diagram of one preferred embodiment of the present invention.

Referring now to FIG. 1, a cache memory which constitutes one preferred embodiment of the present invention will be described in detail. In the FIG. 1 embodiment, there are a total of four tag memory blocks; and they are identified by reference numerals 30, 31, 32 and 33. Each tag memory block has an address input "A", a data output "O", a data input "T", and a write control input "W".

Each of the tag memory blocks 30–33 has a storage capacity of $2^{15}$ words; and each such word consists of eighteen bits. From the four tag memory blocks 30–33, the content of four words are selectively read in parallel in response to a low order address $A_L$. That address $A_L$ is sent on a bus 34 to the address input A of each of the tag memory blocks 30–33.

Stored within each word of the tag memory blocks 30–33 are both a compare address CA and respective control bits CTL. This is indicated by reference numeral 35 which shows the detailed content of a typical word of storage within each of the tag memory blocks. Each compare address occupies fifteen bits of storage and the respective control bits occupy two bits of storage.

A compare address which is read from the output of the tag memory block 30 is notated $CA_0$, and the two control bits which are simultaneously read with that compare address are notated $CTL_0$. Similarly, the compare address and the control bits which are read from the tag memory block 31 are notated $CA_1$ and $CTL_1$ respectively; the compare address and the control bits which are read from the tag memory block 32 are notated $CA_2$ and $CTL_2$ respectively; and the compare address and the control bits which are read from the tag memory block 33 are notated $CA_3$ and $CTL_3$ respectively.

All of the compare addresses $CA_0$, $CA_1$, $CA_2$, and $CA_3$ which are read from the tag memory blocks 30–33 are sent to respective comparators 36a, 36b, 36c and 36d. At the same time, those comparators also receive a high order address $A_H$ from a bus 37. If the higher order address $A_H$ matches the compare address $CA_0$, then the comparator 36a generates a "hit" signal $H_0$ in a true state. Similarly, if the higher order address $A_H$ matches one of the compare addresses $CA_1$, $CA_2$, or $CA_3$, then the comparators 36b, 36c, or 36d respectively generate the hit signals $H_1$, $H_2$, or $H_3$ in a true state.

Each of the hit signals $H_0$, $H_1$, $H_2$ and $H_3$ are sent to respective data memory blocks (which are conventional and thus are not shown); and the low order address $A_L$ is also sent to an address input on all four of those data memory blocks. If the hit signal $H_O$ is true, then a data word which is addressed by the address $A_L$ in the first data memory block is selected as data from the cache; if the hit signal $H_1$ is true, then a data word which is addressed by the address $A_L$ in the second data memory block is selected as data from the cache; etc.

If, however, none of the hit signals $H_0$, $H_1$, $H_2$, or $H_3$ is true, then one of the tag memory blocks 30–33 and a corresponding data memory block is selected for a write operation; and that selection is performed by a digital logic circuit 38. During this write operation, a new compare address and respective control bits are written into a single word in the tag memory block which is selected; and new data is written into the corresponding data memory block. This selection of one of the tag memory blocks 30–33 and corresponding data memory block is made by digitally combining the control bits $CTL_0$, $CTL_1$, $CTL_2$, and $CTL_3$ which are read by the low order address $A_L$ from all of the tag memory blocks 30–33.

In the selected tag memory block, the new compare address which is written is the high order address $A_H$; and the new control bits which are written are generated by the digital logic circuit 38 on a pair of conductors 38a. This write occurs in the word which is addressed by the low order address $A_L$. To write into the tag memory block 30, the digital logic circuit 38 generates a write signal $W_0$ on a conductor 38b. Similarly, to write into the tag memory blocks 31, 32, or 33, the digital logic circuit 38 respectively generates a write signal $W_1$, $W_2$, or $W_3$ on the conductors 38c, 38d and 38e.

Figure 2:
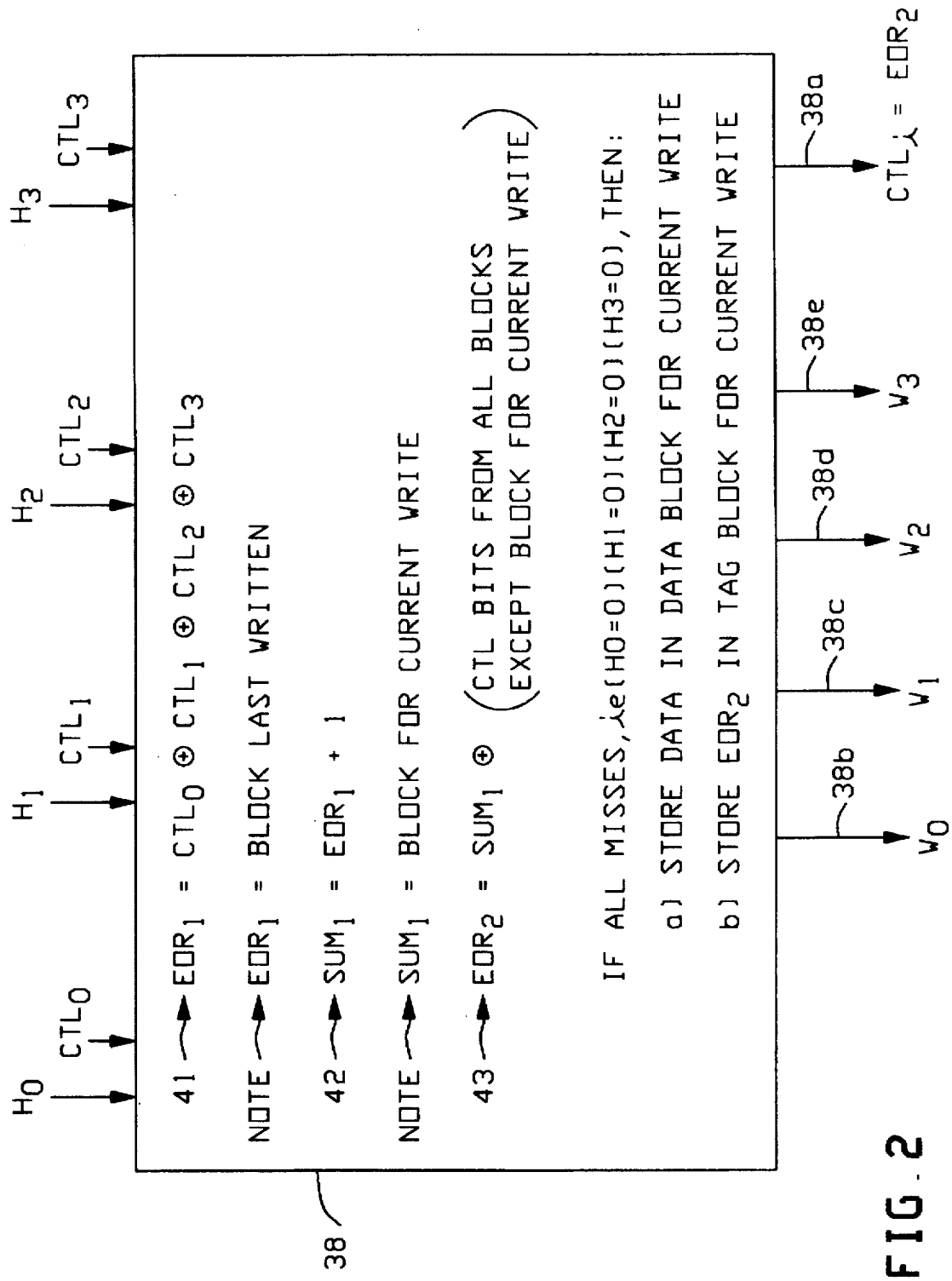
FIG. 2 shows several operations that are performed by a digital logic circuit which is in the FIG. 1 embodiment.

How the digital logic circuit 38 selects one of the tag memory blocks 30–33 for the above write operation is shown in FIG. 2. Initially, the digital logic circuit 38 performs an exclusive-or operation on all of the control bits $CTL_0$, $CTL_1$, $CTL_2$, and $CTL_3$ which are read by the low order address $A_L$ from the tag memory blocks 30–33. This operation is indicated in FIG. 2 as step 41. By performing this step 41, a result $EOR_1$ is generated which identifies the tag memory block and corresponding data memory block which were last written.

Next, the digital logic circuit 38 adds one to the above result $EOR_1$ and thereby generates a sum called $SUM_1$. This step is indicated in FIG. 2 by reference numeral 42. $SUM_1$ which is generated in step 42 identifies the tag memory block and the corresponding data memory block for the current write operation.

Next, the digital logic circuit 38 performs an exclusive-or operation with $SUM_1$ and the control bits from all of the tag memory blocks except the block for the current write. This step is indicated in FIG. 2 by reference numeral 43; and, it generates a result $EOR_2$ which constitutes the new control bits that will be written into the tag memory block that is selected by $SUM_1$.

Figure 3:
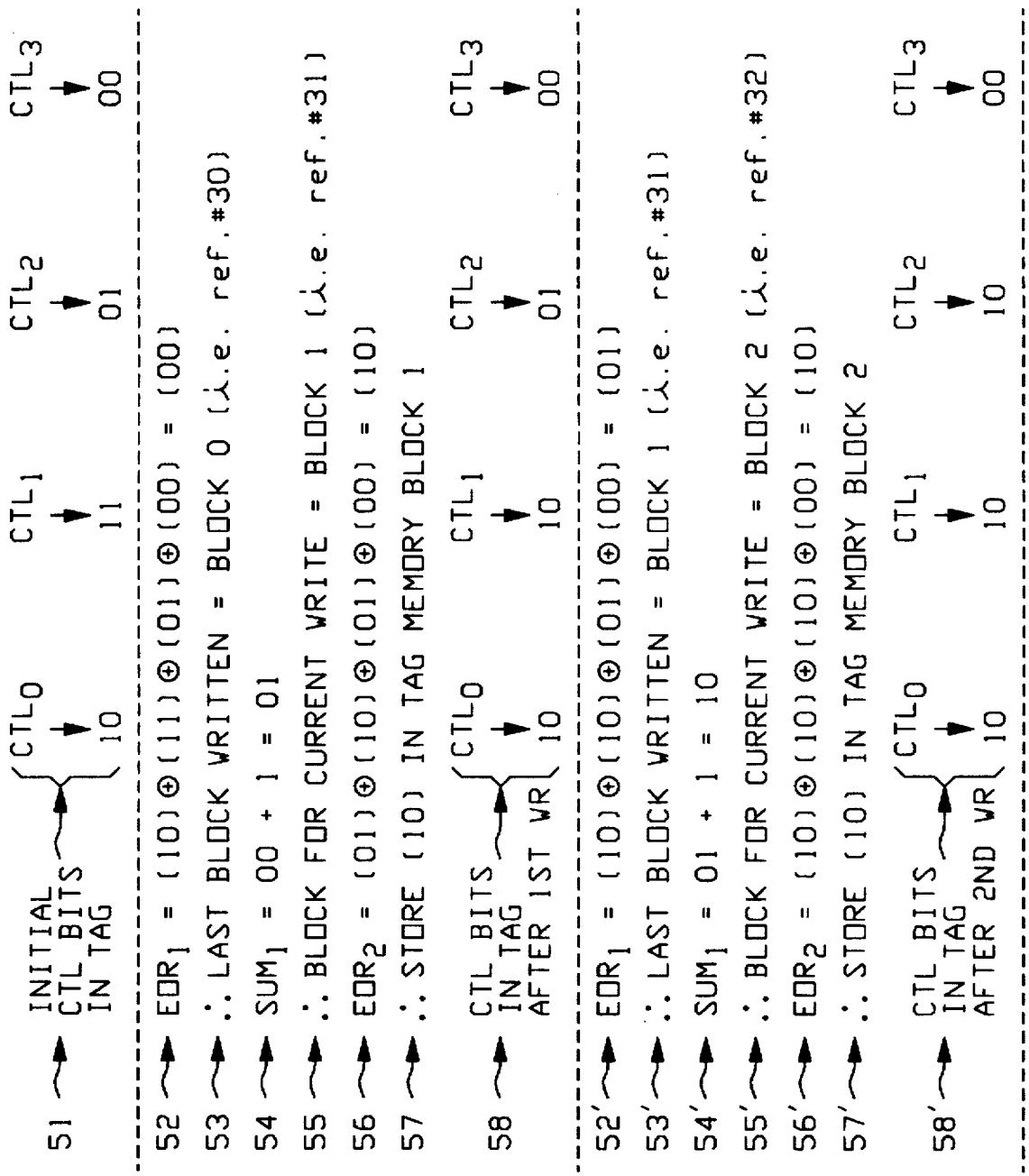
FIG. 3 shows a numerical example of the operations which are performed by the digital logic circuit of FIG. 2.

A numerical example of the above step 41, 42, and 43 which are performed by the digital logic circuit 38 is shown in FIG. 3. There, line 51 shows the initial state of the control bits which are stored in the tag memory blocks 30–33 as addressed by the low order address $A_L$. These initial control bits are arbitrarily selected in FIG. 3 and can have any numerical value.

In order to determine the tag memory block and corresponding data memory block which were last written, all of the control bits in line 51 are exclusive-or'd together. This exclusive-or operation is performed in line 52; and the result $EOR_1$ equals (00). Consequently, as line 53 states, block 0 is the last block which was written.

Next, to determine which tag memory block and corresponding data memory block is to be used for the current write operation, the quantity "1" is added to the exclusive-or result $EOR_1$ of line 52. This operation is performed in line 54, and it generates a result of $SUM_1$=01. Consequently, as stated in line 55, the tag memory block and corresponding data memory block that will be currently written are block 1.

Next, to determine what control bits should be written into the tag memory block 1, the quantity $SUM_1$ is exclusive-or'd with the control bits from all of the tag memory blocks except block 1. This operation is performed in line 56; and it produces a result $EOR_2$=(10). Consequently, the control bits of (10) will be written into the tag memory block 1, and this is stated by line 57. After that write occurs, the control bits $CTL_0$ through $CTL_3$ will be as shown in line 58.

Thereafter, data will be read from the cache memory in a conventional fashion until the high order address $A_H$ miscompares with all of the compare addresses which are read from the tag memory blocks 30–33. When that occurs, all of the above operations are repeated as shown on lines 52'–58'. There, it is assumed for illustrative purposes that when the miscompares occur, the low order address $A_L$ is addressing the same words which were written in line 58.

In order to determine the tag memory block and corresponding data memory block which were last written, all of the control bits in line 58 are exclusive-or'd together. This exclusive-or operation is performed in line 52'; and the result of $EOR_1$ equals (01). Consequently, as line 53' states, block 1 is the last memory block which was written.

Next, to determine which tag memory block and corresponding data memory block is to be used for the current write operation, the quantity "1" is added to the exclusive-or result $EOR_1$ of line 52'. This operation is performed in line 54', and it generates a result of $SUM_1$=(10). Consequently, as stated in line 55', the tag memory block and corresponding data memory block that will be currently written are block (10), which in decimal is block 2.

Next, to determine what control bits should be written into the tag memory block 2, the quantity $SUM_1$ is exclusive-or'd with the control bits from all of the tag memory blocks except block 2. This operation is performed in line 56'; and it produces a result $EOR_2$=(10). Consequently, the control bits of (10) will be written into the tag memory block 2, and this is stated by line 57'. After that write occurs, the control bits CTL0 through CTL3 will be as shown in line 58'.

Figure 4:
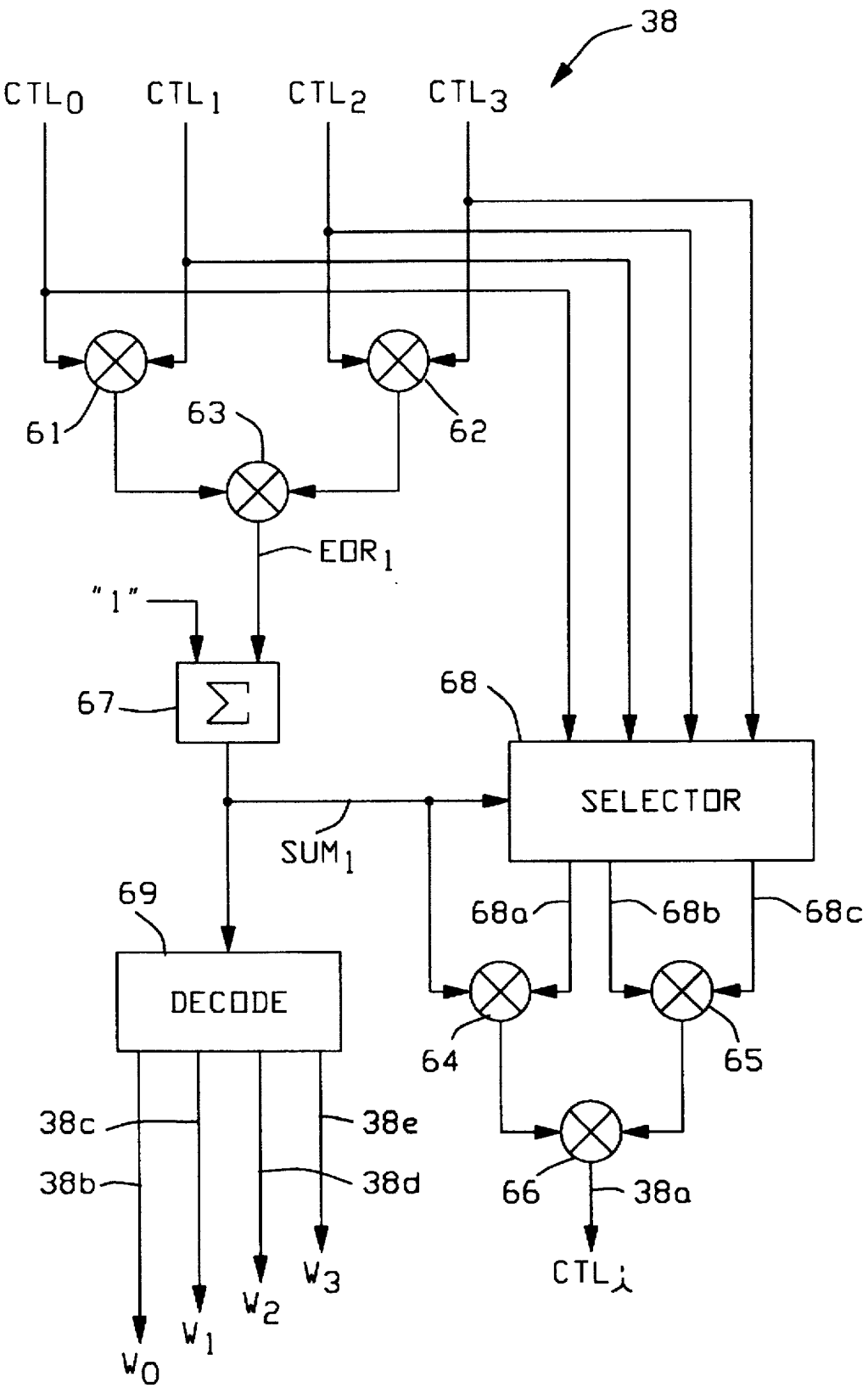
FIG. 4 shows one preferred implementation of the digital logic circuit in FIG. 2.

Turning now to FIG. 4, one preferred implementation of the digital logic circuit 38 will be described in detail. This FIG. 4 implementation includes six exclusive-or gates 61–66, an adder circuit 67, a selector circuit 68, and a decoder circuit 69. All of these components are intercoupled to each other as shown.

In the FIG. 4 implementation, three of the exclusive-or gates 61, 62, and 63 perform an exclusive-or operation on the control bits $CTL_0$ through $CTL_3$ to thereby generate the result $EOR_1$. In other words, the exclusive-or gate 61–63 perform the previously described step 41 in FIG. 2. This result $EOR_1$ which is generated by the exclusive-or gate 61–63, identifies the tag memory block and corresponding data memory block which was last written.

After the exclusive-or result $EOR_1$ is generated, the digital adder 67 increments that result by one. This produces $SUM_1$ which identifies the tag memory block and corresponding data memory block for the current write operation. In other words, the adder 67 performs the previously described step 42 in FIG. 2.

From the adder 67, the result $SUM_1$ is sent to the decoder 69; and in response, the decoder 69 generates one of the write signals $W_0$ through $W_3$. If $SUM_1$=(00), then the decoder 69 generates the write signal $W_0$ on conductor 38b; if $SUM_1$=(01), then the decoder 69 generates signal $W_1$ on conductor 38c; etc. These signals $W_0$ through $W_3$ are used by the tag memory blocks 30–33 in conjunction with a timing pulse (not shown) to perform the write operation.

Also, $SUM_1$ is sent from the adder 67 to the selector 68; and in response, the selector passes three of the control signals $CTL_0$–$CTL_3$ to the three selector outputs 68a–68c. If $SUM_1$=0, then the selector passes $CTL_1$, $CTL_2$ and $CTL_3$; if $SUM_1$=01, then the selector passes $CTL_0$, $CTL_2$, and $CTL_3$; etc. In other words, the selector 68 passes the control bits from all of the blocks except the block for the current write operation.

All of the control bits which are passed by the selector 68 are exclusive-or'd together with $SUM_1$ by the exclusive-OR gates 64–66. Thus, the exclusive-or gates 64–66 perform the previously described step 43 in FIG. 2. By that operation, the result $EOR_2$ is generated; and it constitutes the control bits $CTL_i$ which are to be written into the selected tag memory block.

One preferred embodiment of the present invention has now been described in detail in conjunction with FIGS. 1–4. And, a primary feature of this embodiment is that it stores the compare addresses and respective control bits with substantially less waste of memory, in comparison to the prior art which was described in the BACKGROUND OF THE INVENTION.

As a numerical example, suppose that the tag memory blocks 30–33 in FIG. 1 are implemented with conventional static memory integrated circuit chips in which each word consists of eighteen bits of storage. One such chip is the MEM67N518A from Motorola. With such an implementation, only a single-bit per word is wasted in each of the four tag memory blocks.

By comparison, in the prior art as described in the BACKGROUND OF THE INVENTION, a separate memory block is required for storing just the control bits. If this memory block is implemented with the above chip, then sixteen of those bits per word are wasted. Also, three bits per word are wasted in each of the four tag memory blocks.

Suppose that in both the prior art and the FIG. 1 embodiments, the number of words per block is $2^{15}$. Then, the difference in the amount of memory which is wasted in the prior art embodiment and the FIG. 1 embodiment is $16(2^{15})+3(4)$ $(2^{15})-4(2^{15})$; and that equals 786,432 bits!

Figure 5:
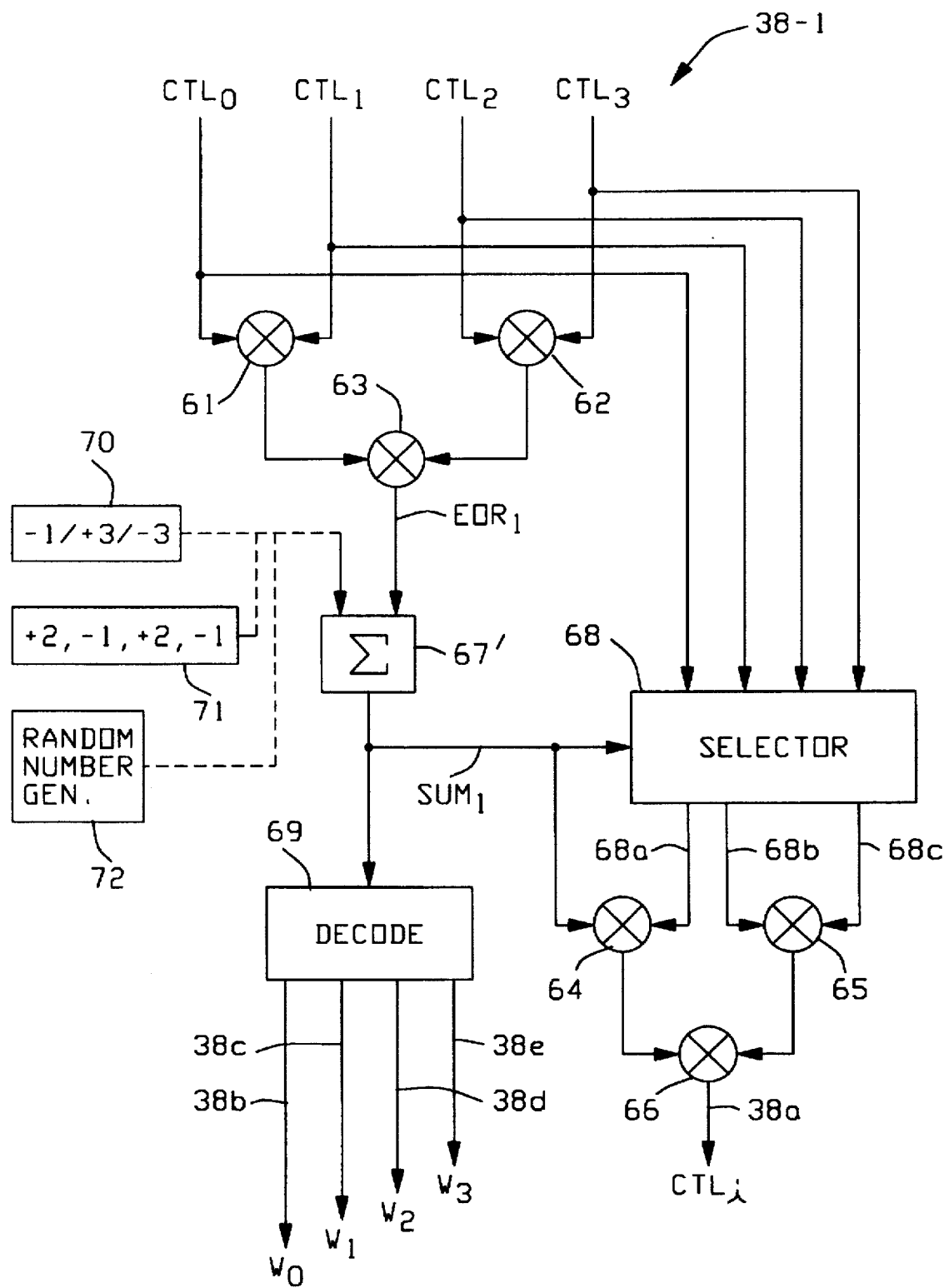
FIG. 5 shows an alternative implementation of the digital logic circuit in FIG. 1.

Turning now to FIG. 5, an alternative embodiment of the present invention will be described. With this alternative embodiment, the digital logic circuit 38 in FIG. 1 is constructed as shown in FIG. 5.

Many of the components which make up the FIG. 5 digital logic circuit are identical to the components which make up the FIG. 4 circuit; and these components are identified with the same reference numerals. In particular, in the FIG. 5 digital logic circuit, the only difference occurs in the adder which is identified by reference numeral 67'. This adder 67' adds any predetermined constant to the exclusive-or result $EOR_1$ to thereby select a tag memory block and corresponding data memory block for the current write operation.

For example, the adder 67' can select the memory block for the current write operation by always adding −1 or +3 or −3 to the exclusive-or result $EOR_1$. This is indicated in FIG. 5 by reference numeral 70. When −1 is added, the tag memory blocks are selected in the sequence block 3, block 2, block 1, block 0, block 3, etc.

Alternatively, the constant which is added to the exclusive-or result $EOR_1$ can change with time in a repetitive sequence. This is indicated in FIG. 5 by reference numeral 71 wherein the repetitive sequence is +2, −1, +2, −1, . . . , etc. When this is done, the tag memory blocks are selected in the sequence block 2, block 1, block 3, block 2, block 0, block 3, etc.

Further, the constant which is added to the exclusive-or result $EOR_1$ can change with time in a nonrepetitive fashion. This is indicated in FIG. 5 by reference numeral 72 wherein the constant which is added to the exclusive-or result $EOR_1$ is produced by a random number generator. When this is done, the tag memory blocks are selected in a random sequence.

Next, another alternative embodiment of the present invention will be described in conjunction with the FIG. 6. With this alternative embodiment, the previously described digital logic circuit 38 in FIG. 1 is constructed as shown in FIG. 6.

Figure 6:
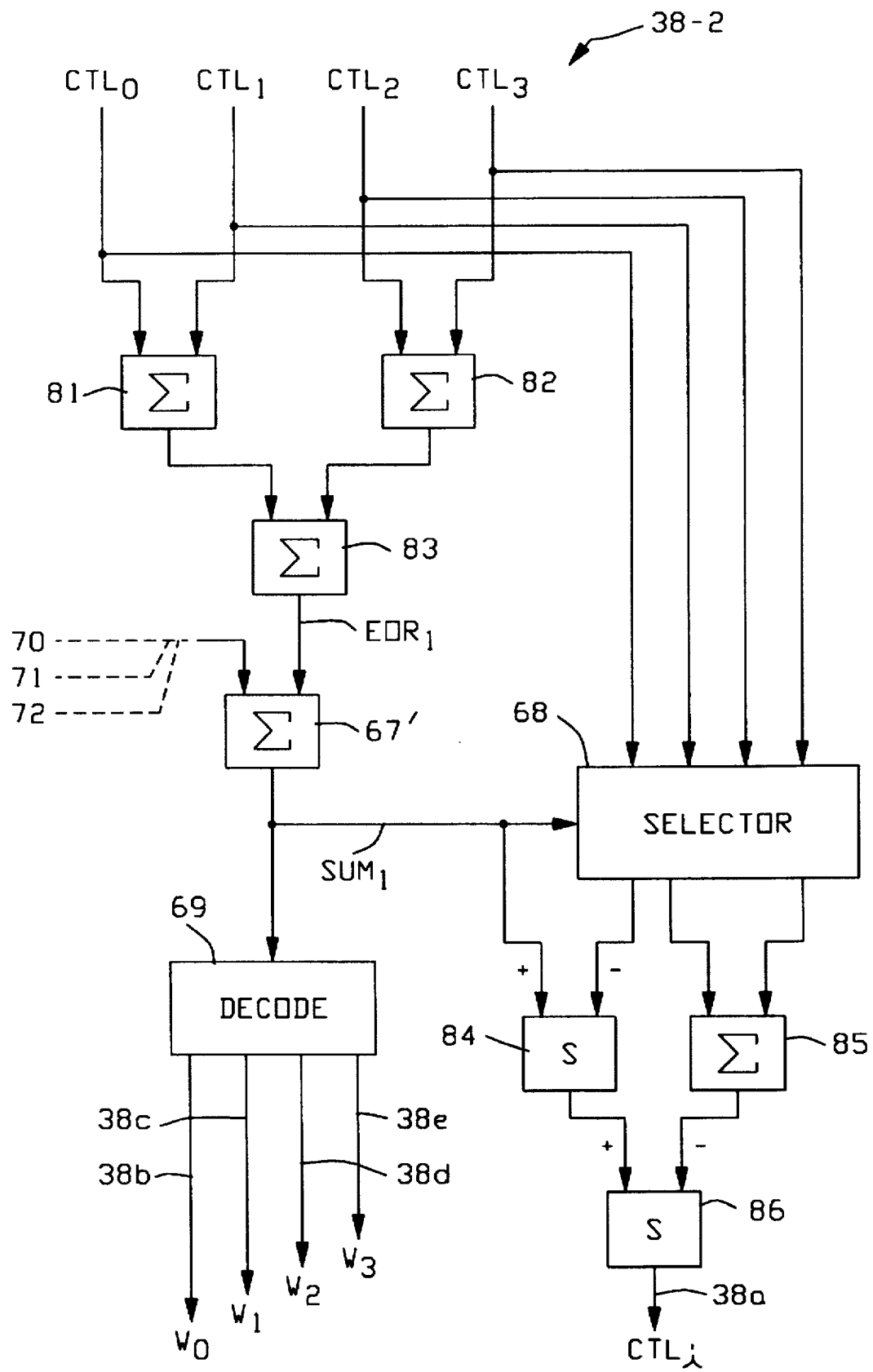
FIG. 6 shows another alternative implementation of the digital logic circuit in FIG. 1.

This FIG. 6 digital logic circuit is similar to the FIG. 5 circuit in that it includes the adder circuit 67', the selector 68, and the decoder 69. However, the FIG. 6 circuit differs from the FIG. 5 circuit in that the exclusive-or gates 61, 62, 63, and 65 are replaced with adders 81, 82, 83, and 85; and the exclusive-or gate 64 and 66 are replaced with subtractors 84 and 86.

In operation, all of the control signals $CTL_0$ through $CTL_3$ are added together by adders 81–83; and that add operation produces the result $EOR_1$ which identifies the tag memory block and corresponding data memory block which was last written. To select one tag memory block and corresponding data memory block for the current write, any predetermined constant is added to the result $EOR_1$. This addition of a constant to $EOR_1$ is performed by the adder 67'; and the result generated is given by $SUM_1$.

From the adder 67', the $SUM_1$ result is sent to the selector 68 which passes the control bits from all of the tag memory blocks except the block for the current write operation. Then, by means of components 84, 85 and 86, the control signals which are passed through the selector 68 are subtracted from $SUM_1$. This operation produces the control signals $CTL_1$ which are written into the tag memory block that is selected by $SUM_1$.

As an example of the above, suppose that $SUM_1$ equals (00), which means that a tag memory block 0 is selected for the current write. In that case, the control signals $CTL_1$ which will be written into the tag memory block 0 will equal $(00)-CTL_1-CTL_2-CTL_3$. After that write occurs, signal $EOR_1$ which identifies the tag memory block that was last written will equal (00). This is because the adders 81–83 generate $EOR_1$ as $CTL_0+CTL_1+CTL_2+CTL_3$; and from what was explained above, $CTL_0$ equals $(00)-CTL_1-CTL_2-CTL_3$.

Next, with reference to FIG. 7, still another alternative embodiment of the present invention will be described. With this alternative embodiment, the previously described digital logic circuit 38 of FIG. 1 is constructed as shown in FIG. 7.

Figure 7:
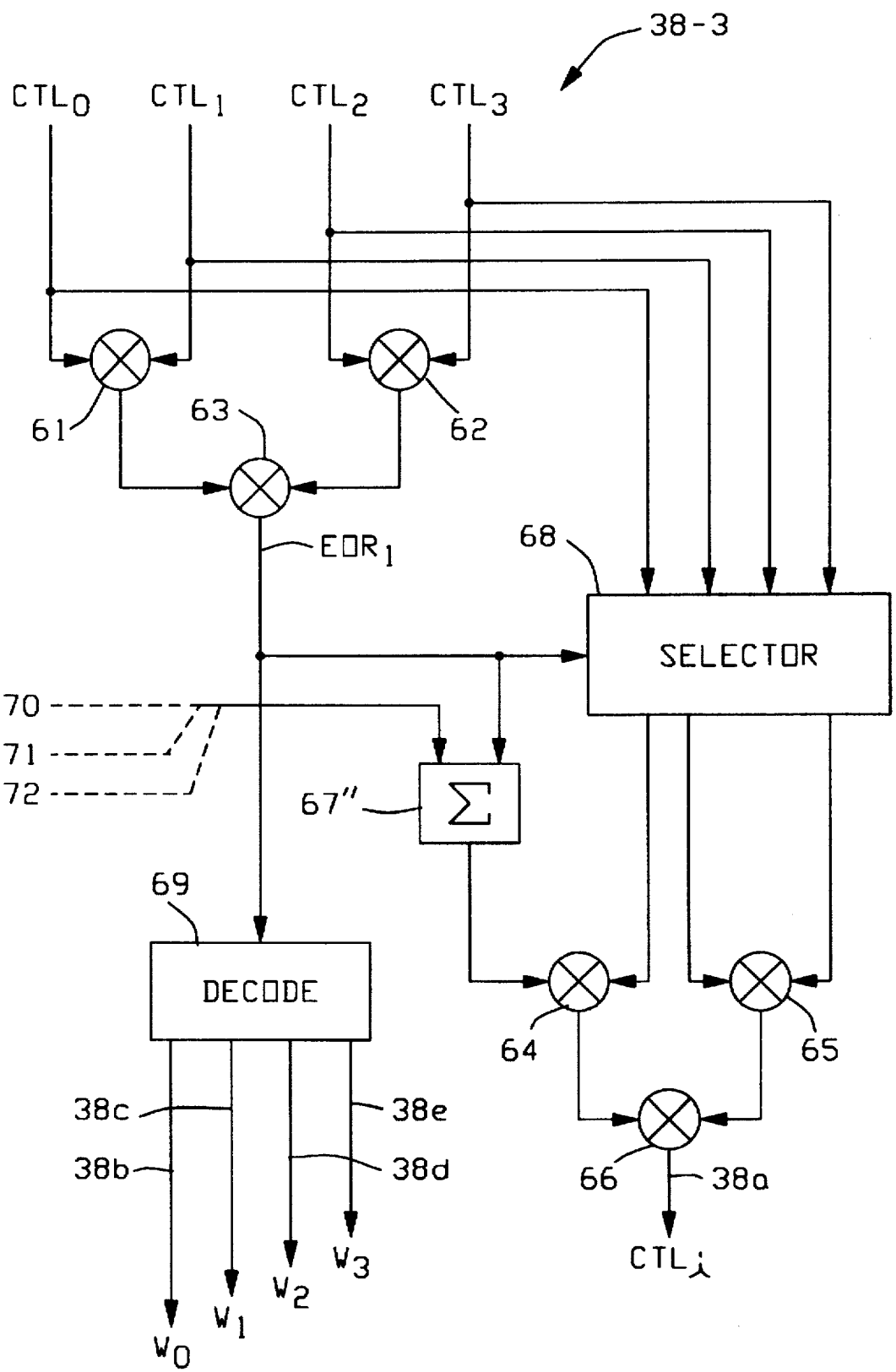
FIG. 7 shows still another alternative implementation of the digital logic circuit in FIG. 1.

All of the components in the FIG. 7 circuit are the same as the components in FIG. 4 except that the adder 67 is replaced with an adder 67". This new adder 67" has an output which is connected only to the exclusive-or gate 64; whereas, in FIG. 4, the adder 67 has an output which is connected to the decoder 69, the selector 68, and the exclusive-or gate 64.

Due to the above structural change, the identity of the tag memory block and corresponding data memory block which are to be written is generated directly by the exclusive-or gate 63 as $EOR_1$. Also due to the above structural change, the identity of the tag memory block and corresponding data memory block which will be written next is generated by the output of the adder 67".

As a numerical example of how the FIG. 7 embodiment operates, suppose that the exclusive-or result $EOR_1$ equals (00), which means that block 0 is selected for the current write operation. In that case, the new control bits which will be written into the tag memory block 0 are generated as (00+a constant) which is exclusive-or'd with $CTL_1$ and $CTL_2$ and $CTL_3$.

After the above write occurs, the exclusive-or result $EOR_1$ which identifies the tag memory block to write next will equal (00+a constant). This is because the exclusive-or gates 61–63 generate $EOR_1$ as $CTL_0 \oplus CTL_1 \oplus CTL_2 \oplus CTL_3$; and from what was explained above, $CTL_0$ equals (00+a constant)$\oplus CTL_1 \oplus CTL_2 \oplus CTL_3$. Consequently, the duplicated terms $CTL_1$ and $CTL_2$ and $CTL_3$ cancel out.

Also, as another similar modification, the adder 67' in FIG. 6 can be relocated just like the adder 67" in FIG. 7. With this modification, the output of the adder 67' will connect to the "+" input of the subtractor 84; and the output of the adder 83 will connect directly to the decoder 69, the selector 68, and one of the inputs of the adder 67'. Due to this structural change, the identity of the tag memory block and corresponding memory block which are to be written is generated directly by the output of the adder 83 as $EOR_1$; and the identity of the tag memory block and corresponding data memory block which will be written next is generated by the output of the adder 67'.

Further, in still another modification, the total number of tag memory blocks and corresponding data memory blocks which are in the cache memory can be increased or decreased from the four blocks which are shown in FIG. 1. Preferably, the total number of tag memory blocks and corresponding data memory blocks ranges from 2–16. When the total number of tag memory blocks is 2, 3–4, 5–8, or 9–16, then the number of control bits which are stored in each work of the tag memory blocks respectively is 1, 2, 3, or 4.

As the total number of tag memory blocks is increased or decreased, the digital logic circuits which have been described in conjunction with FIGS. 4–7 also increase or decrease in order to accommodated all of the control bits. For example, suppose that the total number of tag memory blocks is eight, and suppose that the control bits and write signals for those eight tag memory blocks are generated in accordance with the digital logic circuit of FIG. 4. This is achieved by increasing the number of exclusive-or gates 61-63 such that the control bits from all eight of the tag memory blocks can be exclusive-or'd together to form the result $EOR_1$. Likewise, the selector 68 needs to be expanded such that it receives the control signals from all eight of the tag memory blocks and passes seven of those control signals on its output. Similarly, the exclusive-or gates 64-66 need to be expanded such that they can exclusive-or all seven outputs from the selector 68 with the result $SUM_1$ from the adder 67. Further, the decoder 69 needs to be modified such that it decodes the adder output $SUM_1$ into eight write signals $W_0$-$W_7$.

Also, as another modification, the total number of words in each tag memory block and corresponding data memory block can be increased or decreased from $2^{15}$. Preferably, that total number of words in each block is $2^x$, where x is an integer which ranges from 8-20. To accommodate this range, no modification needs to be made to the digital logic circuits of FIG. 4-7.

Accordingly, since many different embodiments of the present invention can be made, it is to be understood that the invention is not limited to any one particular embodiment but is defined by the appended claims.

What is claimed is:

1. A cache memory which includes—a plurality of tag memory blocks, each of which stores multiple compare addresses; a first bus which sends a low order address to all of said tag memory blocks; a respective output from each tag memory block on which a compare address is read in response to said low order address; a second bus which carries a high order address; and, a comparator circuit which generates a miss signal when the compare address on the output from every tag memory block miscompares with said high order address; wherein, each tag memory block further stores respective control bits with each compare address;

each tag memory block responds to said low order address by reading said compare address and said respective control bits, in parallel, on said respective output; and, a digital logic circuit is coupled to the outputs from all of said tag memory blocks, which selects one of said tag memory blocks to write when said miss signal occurs by generating the exclusive-or of said control bits that are read by said low order address from all of said tag memory blocks; and wherein said digital logic circuit generates new control bits to write in said one tag memory block, by adding a constant to said exclusive-or and exclusive-oring the result with said control bits which are read by said low order address from all of said tag memory block except said one selected block.

2. A cache memory according to claim 1 wherein each tag memory block is comprised of an integrated circuit memory chip which is addressed by said low order address on said first bus, and wherein each memory chip reads a group of at least sixteen bits in response to said low order address.

3. A cache memory according to claim 1 wherein each tag memory block is comprised of multiple integrated circuit memory chips which are addressed simultaneously by said low order address on said first bus, and wherein each memory chip reads a group of at least eight bits in response to said low order address.

4. A cache memory which includes—a plurality of tag memory blocks, each of which stores multiple compare addresses; a first bus which sends a low order address to all of said tag memory blocks; a respective output from each tag memory block on which a compare address is read in response to said low order address; a second bus which carries a high order address; and, a comparator circuit which generates a miss signal when the compare address on the output from every tag memory block miscompares with said high order address; wherein, each tag memory block further stores respective control bits with each compare address;

each tag memory block responds to said low order address by reading said compare address and said respective control bits, in parallel, on said respective output; and, a digital logic circuit is coupled to the outputs from all of said tag memory blocks, which selects one of said tag memory blocks to write when said miss signal occurs by generating the sum of a binary number and the exclusive-or of said control bits that are read by said low order address from all of said tag memory blocks.

5. A cache memory according to claim 4 wherein said digital logic circuit generates new control bits to write in said one tag memory block, by exclusive-oring said sum with said control bits which are read by said low order address from all of said tag memory blocks except said one selected block.

6. A cache memory according to claim 5 wherein each tag memory block is comprised of an integrated circuit memory chip which is addressed by said low order address on said first bus, and wherein each memory chip reads a group of at least sixteen bits in response to said low order address.

7. A cache memory according to claim 5 wherein each tag memory block is comprised of multiple integrated circuit memory chips which are addressed simultaneously by said low order address on said first bus, and wherein each memory chip reads a group of at least eight bits in response to said low order address.

8. A cache memory which includes—a plurality of tag memory blocks, each of which stores multiple compare addresses; a first bus which sends a low order address to all of said tag memory blocks; a respective output from each tag memory block on which a compare address is read in response to said low order address; a second bus which carries a high order address; and, a comparator circuit which generates a miss signal when the compare address on the output from every tag memory block miscompares with said high order address; wherein, each tag memory block further stores respective control bits with each compare address;

each tag memory block responds to said low order address by reading said compare address and said respective control bits, in parallel, on said respective output; and, a digital logic circuit is coupled to the outputs from all of said tag memory blocks, which selects one of said tag memory blocks to write when said miss signal occurs by generating the sum of a binary number and said control bits that are read by said low order address from all of said tag memory blocks.

9. A cache memory according to claim 8 wherein said digital logic circuit generates new control bits to write in said one tag memory block, by subtracting from said sum, said control bits which are read by said low order address from all of said tag memory blocks except said one selected block.

10. A cache memory according to claim 9 wherein each tag memory block is comprised of an integrated circuit memory chip which is addressed by said low order address on said first bus, and wherein each memory chip reads a group of at least sixteen bits in response to said low order address.

11. A cache memory according to claim 9 wherein each tag memory block is comprised of multiple integrated circuit memory chips which are addressed simultaneously by said low order address on said first bus, and wherein each memory chip reads a group of at least eight bits in response to said low order address.

12. A cache memory which includes—a plurality of tag memory blocks, each of which stores multiple compare addresses; a first bus which sends a low order address to all of said tag memory blocks; a respective output from each tag memory block on which a compare address is read in response to said low order address; a second bus which carries a high order address; and, a comparator circuit which generates a miss signal when the compare address on the output from every tag memory block miscompares with said high order address; wherein, each tag memory block further stores respective control bits with each compare address;

each tag memory block responds to said low order address by reading said compare address and said respective control bits, in parallel, on said respective output; and, a digital logic circuit is coupled to the outputs from all of said tag memory blocks, which selects one of said tag memory blocks to write when said miss signal occurs by generating the sum of said control bits that are read by said low order address from all of said tag memory blocks.

13. A cache memory according to claim 12 wherein said digital logic circuit generates new control bits to write in said one tag memory block, by adding a constant to said sum and subtracting said control bits which are read by said low order address from all of said tag memory blocks except said one selected block.

14. A cache memory according to claim 13 wherein each tag memory block is comprised of an integrated circuit memory chip which is addressed by said low order address on said first bus, and wherein each memory chip reads a group of at least sixteen bits in response to said low order address.

15. A cache memory according to claim 13 wherein each tag memory block is comprised of multiple integrated circuit memory chips which are addressed simultaneously by said low order address on said first bus, and wherein each memory chip reads a group of at least eight bits in response to said low order address.

* * * * *